United States Patent
Richmond

[11] Patent Number: 5,567,093
[45] Date of Patent: Oct. 22, 1996

[54] SEAL FOR COOLANT-FED TOOLS

[76] Inventor: Daryl E. Richmond, 17623 Marmoset St. NW, Ramsey, Minn. 55303

[21] Appl. No.: 420,073

[22] Filed: Apr. 11, 1995

[51] Int. Cl.$^6$ .............................. B23C 5/28; B23B 31/20; B23B 51/06
[52] U.S. Cl. ..................................... 409/136; 277/DIG. 3; 279/46.1; 279/46.9; 408/57; 408/59; 409/234
[58] Field of Search ..................................... 409/135, 136, 409/234; 277/DIG. 3; 408/56, 57, 59; 407/11, 120; 279/467, 46.9, 46.1, 4.07

[56] References Cited

U.S. PATENT DOCUMENTS

| | | | |
|---|---|---|---|
| 2,933,321 | 4/1960 | Cascone | 279/20 |
| 3,024,030 | 3/1962 | Koch | 279/20 |
| 3,421,392 | 1/1969 | Bangerter et al. | 77/7 |
| 3,905,609 | 9/1975 | Sussman | 279/20 |
| 4,189,162 | 2/1980 | Rasmussen et al. | 279/4 |
| 4,320,999 | 3/1982 | Briese | 409/136 |
| 4,705,439 | 11/1987 | Hoyle et al. | 409/136 |
| 5,020,946 | 6/1991 | Nann | 409/136 |
| 5,028,178 | 7/1991 | Ronen | 409/136 |
| 5,324,050 | 6/1994 | Kanaan | 279/46.7 |
| 5,405,155 | 4/1995 | Kanaan et al. | 279/46.7 |
| 5,405,220 | 4/1995 | Ishikawa | 408/56 |

*Primary Examiner*—William R. Briggs
*Attorney, Agent, or Firm*—Kinney & Lange, P.A.

[57] ABSTRACT

A fluid seal device for preventing fluid from flowing around a tool secured to a tool holder by a collapsible collet having slots extending from a first end of the collet to a second end of the collet and a collet nut is disclosed. The tool has an inner chamber through which fluid is fed to a tool tip. The fluid seal device includes an O-ring positioned around the tool between the tool tip and the first end of the collet. A rigid seal is positioned about the drill bit and the O-ring, and is positioned between the first end of the collet and the collet nut such that fluid flowing within the slots of the collet is prevented from flowing past the rigid seal, thereby providing maximum fluid pressure within the inner chamber.

6 Claims, 4 Drawing Sheets

SEAL FOR COOLANT-FED TOOLS

BACKGROUND OF THE INVENTION

The present invention relates to the field of coolant-fed tools, such as the kind used in a tool assembly. More specifically, the present invention is an apparatus for preventing fluid from flowing around a tool secured to a tool holder by a combination of a collet and a collet nut such that the coolant is forced down an inner chamber of the tool to provide both a coolant and a lubricant at the tool tip.

Coolant-fed tools, such as the kind used in a drill press, are commonly used to drill or bore holes into extremely strong materials, such as steel or brass. Coolant-fed drills includes a tool which has an inner chamber through which pressurized coolant is fed to provide both a coolant and a lubricant at the tool tip. The pressurized fluid both flushes out shavings of the material being drilled and prevents the tool bit from overheating and breaking.

In most instances, it is important to maintain a strong fluid pressure within the inner chamber of the tool and at the tool tip. In some applications, it is necessary to have a fluid pressure of greater than 200 pounds per square inch (psi), and in some applications it is necessary to have a fluid pressure of up to 1,500 psi. In order to provide such a strong fluid pressure, it is necessary for all of the fluid to be forced within the inner chamber of the tool. Fluid flowing around the tool can diminish the pressure and a tool break-down can occur.

In most machining applications, fluid from a pressurized fluid system is flooded toward the end of the tool opposite the tool tip. Some of the fluid is forced down the inner chamber of the tool. However, a substantial portion of the fluid travels around the tool and through slots in a collet securing the tool to the tool holder. These slots are necessary to allow the collet to collapse and securely grip varying sized tools.

Due to the configuration of most coolant-fed tool holders, a substantial amount of pressure is lost when fluid travels around the drill bit through the slots and the collet. Therefore, there is a need for an apparatus which can be adapted to standard coolant-fed tool holders which will prevent pressurized fluid from flowing around a tool, and will thus force all fluid down the inner chamber of the tool to maximize pressure at the tool tip.

SUMMARY OF THE INVENTION

The present invention is a fluid seal device for preventing fluid from flowing around a tool having an inner chamber positioned in a first plane through which fluid is fed to a tool tip. The tool is secured to a tool holder by a combination of a collapsible collet having slots extending from a first end of the collet to a second end of the collet and a collet nut. The fluid seal device includes an O-ring positioned around the tool between the tool tip and the first end of the collet. A rigid seal is positioned about the tool and the O-ring and is positioned between the first end of the collet and the collet nut such that any fluid flowing within the slots of the collet about the tool is prevented from flowing past the rigid seal. Thus, all pressurized fluid will be forced through the inner chamber of the tool and will provide proper coolant and lubricant at the tool tip.

The rigid seal further comprises a first portion, a second portion, and a third portion. The first portion of the rigid seal has an inner diameter approximately equal to an outer diameter of the tool and an outer diameter approximately equal to the outer diameter of the O-ring. The first portion of the rigid seal is positioned adjacent to the O-ring between the O-ring and the tool tip. The second portion of the rigid seal is connected to the first portion of the rigid seal and encompasses the O-ring. The second portion of the rigid seal has an inner diameter approximately equal to the outer diameter of the O-ring. A third portion of the rigid seal is connected to the second portion of the fluid seal at an angle of between 0 degrees and 90 degrees from the second portion and preferably between 30 and 60 degrees from the second portion. This angle is a matching angle of the collet and the collet nut. The third portion of the rigid seal is positioned between the first end of the collet and the collet nut.

DETAILED DESCRIPTION OF THE PREFERRED EMBODIMENTS

Figure 1:
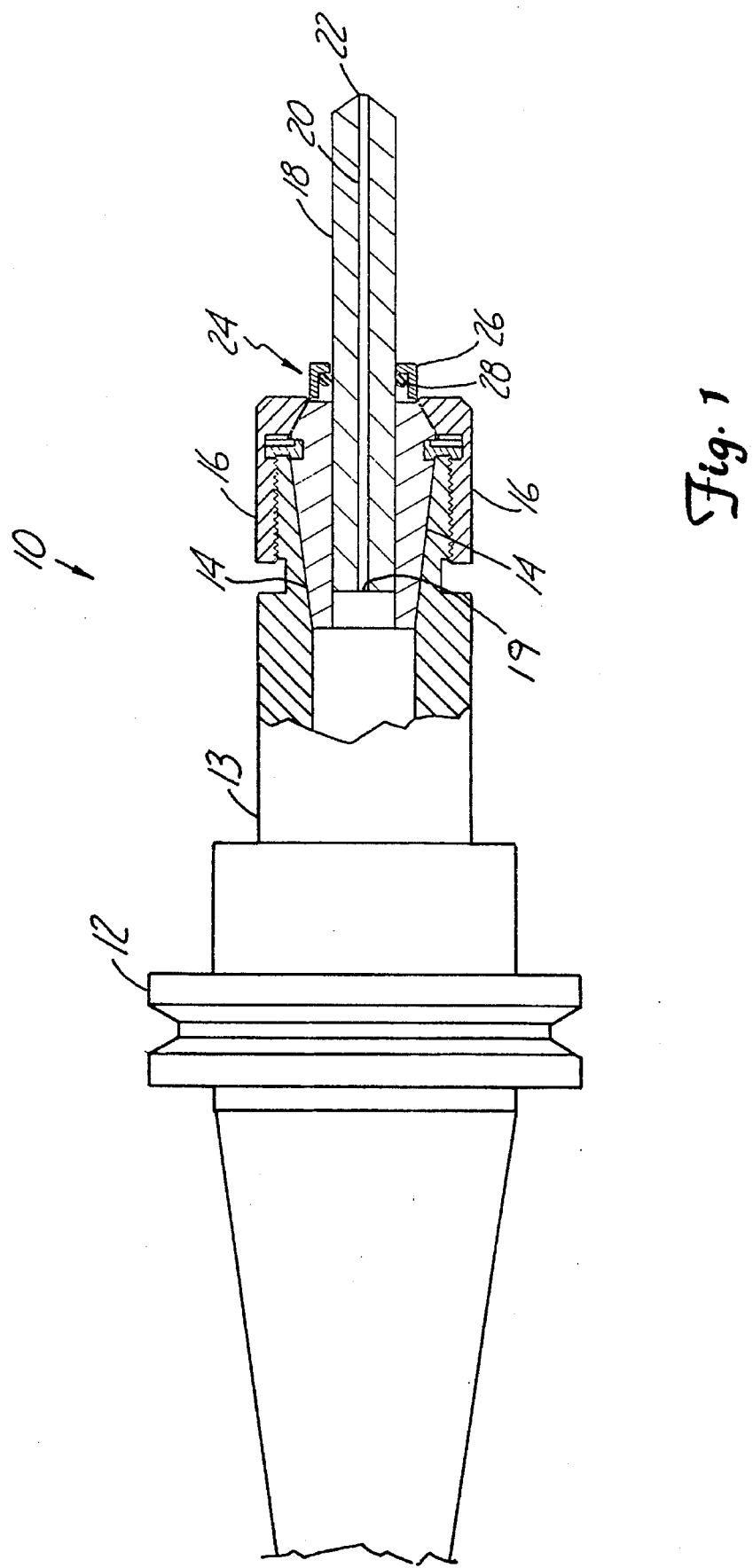
FIG. 1 is a side view and partial sectional view of a tool holder including a tool used for drilling various materials, the tool holder incorporating the present invention.

FIG. 1 is a side and partial sectional view of a tool holder including a tool used for drilling various materials, the tool holder incorporating the present invention. Cutting tool assembly 10, shown in FIG. 1, includes tool holder 12 having tool holder shaft 13, collet 14, collet nut 16, tool 18 having chamber 20 and tool tip 22, fluid seal device 24 including rigid fluid seal 26 and O-ring 28.

In operation, drill bit tool assembly 10 is used to drill or bore holes through various materials made of substantial strength, such as brass and steel. Because there is a high amount of friction generated between tool tip 22 and the material being drilled, milled or bored, it is necessary to provide a fluid through chamber 20 of tool 18 to tool tip 22 to provide both a coolant and a lubricant.

In order to provide fluid to tool tip 22, drill bit tool assembly 10 is connected to a pressurized fluid system (not shown). A fluid tank provides a pressurized fluid through tool holder shaft 13 of tool holder 12. Much of the pressurized fluid is forced through chamber 20 of tool 18 via entrance 19. However, a substantial amount of fluid is forced about and around tool 18 within slots in collet 14. The slots in collet 14 provide a collapsible feature of collet 14 which is necessary to properly grip varying size tools. Without fluid seal device 24 properly in place, much of this fluid would flood around tool 18, and thus a substantial amount of fluid pressure would be lost. In some operations, a fluid pressure of greater than 200 pounds per square inch (psi), and in some applications it is necessary to have a fluid pressure of up to 1,500 psi is necessary to ensure proper coolant and lubricant. This type of fluid pressure cannot be achieved when fluid is traveling about and around tool 18. Rather, it is necessary to have all of the fluid from the pressurized system focused down chamber 20 of tool 18.

Figure 2:
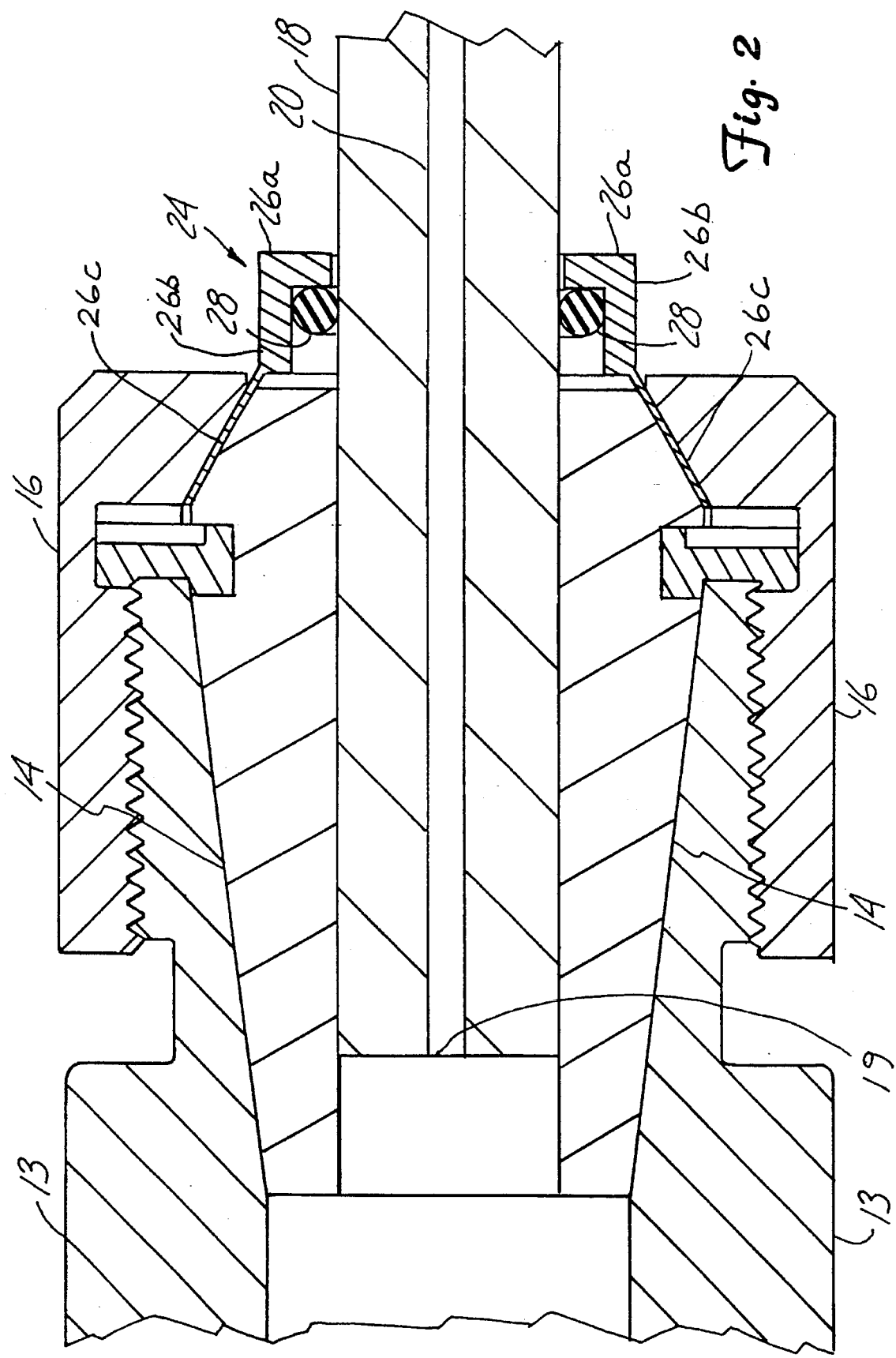
FIG. 2 is an exploded sectional view of a portion of the tool holder shown in FIG. 1 incorporating the present invention.

FIG. 2 is an exploded sectional view of a portion of tool holder 12 incorporate the present invention. As shown in FIG. 2, fluid seal device 24 includes fluid seal 26 and O-ring 28. Fluid seal device 24 prevents pressurized fluid from traveling about and around tool 18, and therefore focuses all pressurized fluid through chamber 20 of tool 18. Thus, the necessary pressure at tool tip 22 is achieved to provide proper coolant and lubrication at tool tip 22 (shown in FIG. 1). Fluid seal 26 includes first portion 26a, second portion 26b, and third portion 26c. First portion 26a holds O-ring 28 in position and prevents O-ring 28 from moving towards tool tip 22. Second portion 26b, which is connected to first portion 26a, forces O-ring 28 to stay in contact with the outer surface of tool 18. Third portion 26c, which is connected to second portion 26b at an angle of between 0 degrees and 90 degrees from a plane parallel to chamber 20 of tool 18, holds fluid seal device 24 in place. Third portion 26c is secured by collet nut 16 to collet 14.

In operation, any fluid flowing from a pressurized fluid system about and around tool 18 through the slots and collet 14 will be prevented from traveling past fluid seal device 24 towards tool tip 22. Fluid will build up within the slots in collet 14 until the slots are filled with fluid. At this point, all pressurized fluid will then be focused through chamber 20 of tool 18 to tool tip 22. Thus, pressure of the fluid traveling down chamber 20 of tool 18 can be maximized and pressures in excess of 1,000 psi can be achieved at tool tip 22.

Figure 3:
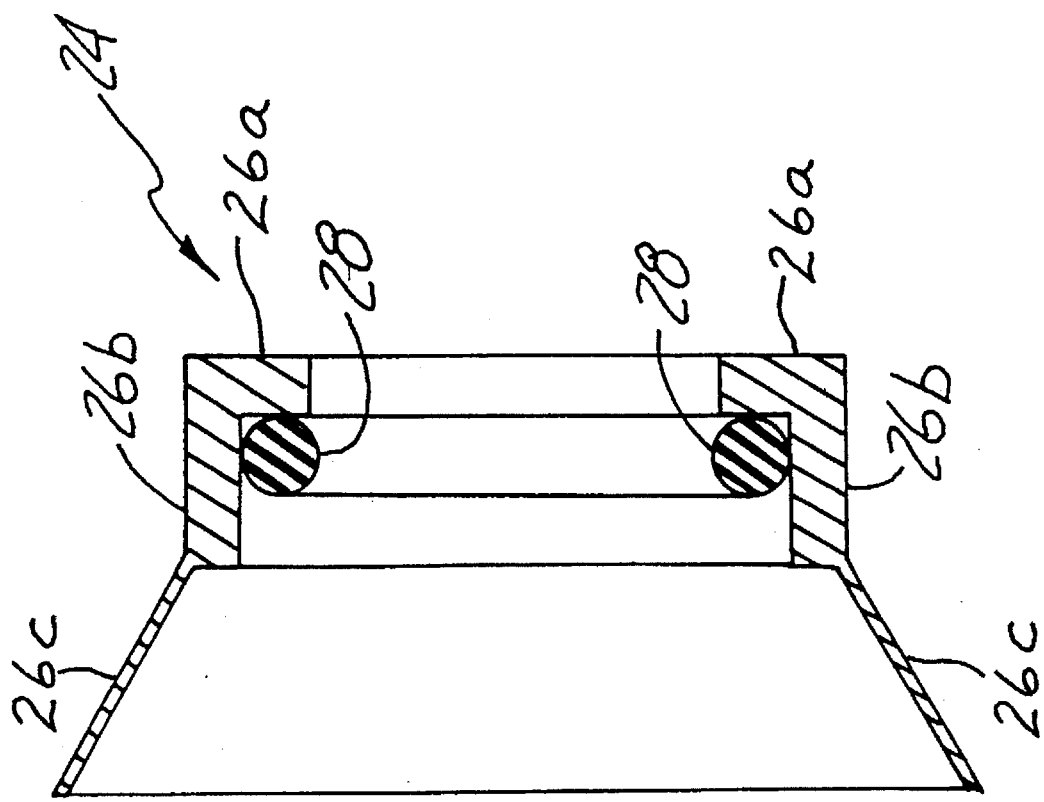
FIG. 3 is a sectional side view of the present invention.
Figure 4:
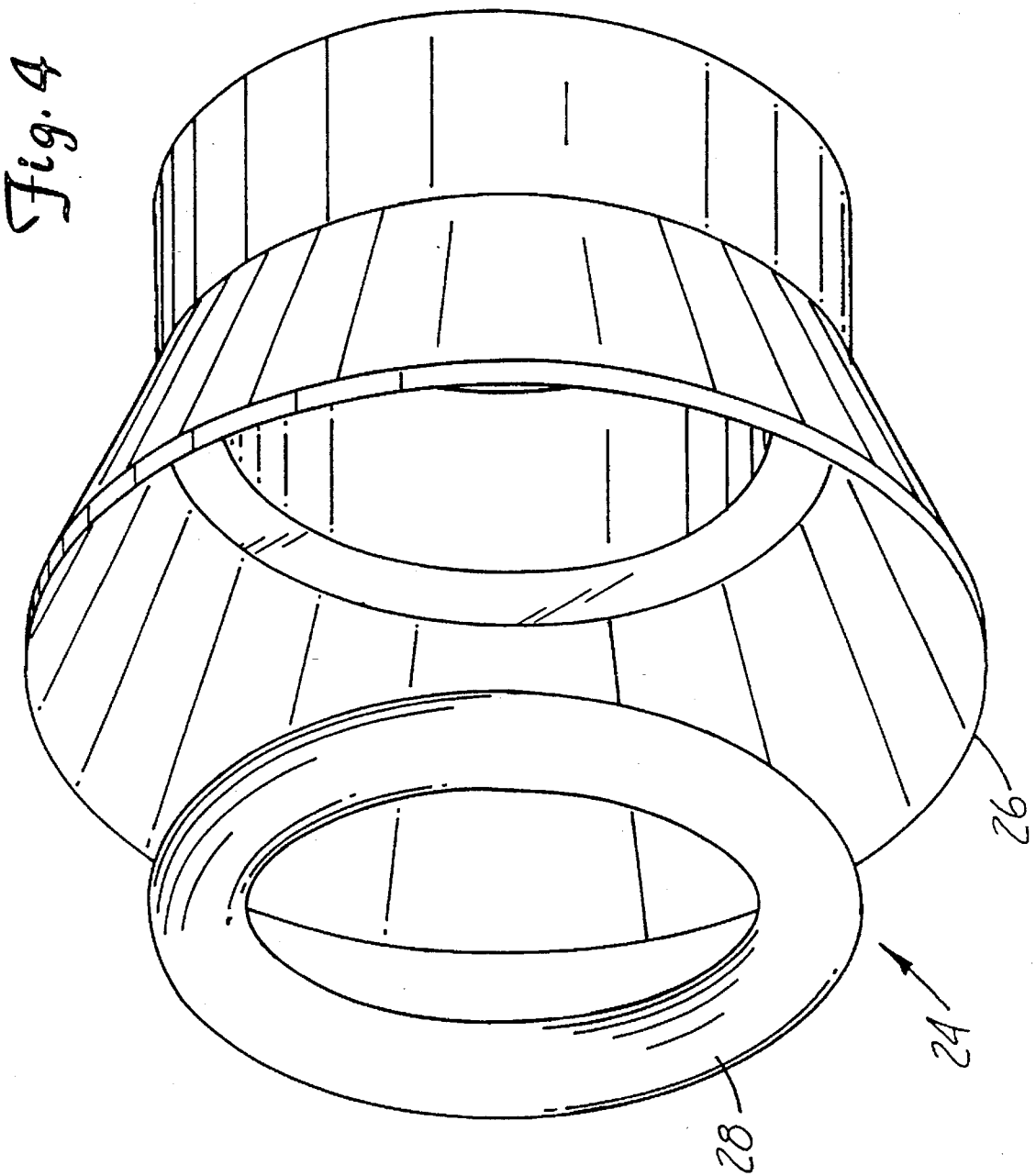
FIG. 4 is a perspective view of the present invention.

FIG. 3 is a sectional side view of the present invention, while FIG. 4 is a perspective view of the present invention. More particularly, FIG. 3 shows fluid seal device 24 having fluid seal 26 (having first portion 26a, second portion 26b, and third portion 26c) and O-ring 28. FIG. 3 shows the proper positioning of O-ring 28 with respect to fluid seal 26. Conversely, FIG. 4 shows O-ring 28 positioned away from fluid seal 26 for clarity so that both O-ring 28 and fluid seal 26 can properly be seen.

Fluid seal 26 can be made from a variety of materials including, but not limited to brass, aluminum or steel. O-ring 28 can also be made from numerous materials including, but not limited to rubber or plastic. In addition, the configurations of fluid seal 26 and O-ring 28 can be changed such that they will correspond to various size and configured tools.

Although the present invention has been described with reference to preferred embodiments, workers skilled in the art will recognize that changes may be made in form and detail without departing from the spirit and scope of the invention.

What is claimed is:

1. A fluid seal device for preventing fluid from flowing around a tool, the tool having an inner channel having an entrance opening and an exit opening through which fluid is fed to a tip of the tool, the tool being secured to a tool holder by a combination of a collapsible collet having slots extending from a first end of the collet to a second end of the collet and a collet nut, the fluid seal comprising:

an O-ring positioned around the tool between the tool tip and the first end of the collet, the first end of the collet being remote from the tool tip; and a rigid seal positioned about the tool and the O-ring, and positioned between the first end of the collet and the collet nut such that fluid flowing within the slots of the collet is prevented from flowing past the fluid seal.

2. The fluid seal device of claim 1 wherein the rigid seal further comprises:

a first portion having an inner diameter approximately equal to an outer diameter of the tool and having an outer diameter larger than an outer diameter of the O-ring;

a second portion connected to the first portion, the second portion encompassing the O-ring and having an inner diameter approximately equal to the outer diameter of the O-ring; and a third portion connected to the second portion at an angle of between 0 degrees and 90 degrees from the second portion, the third portion positioned between the first end of the collet and the collet nut.

3. An apparatus for providing a fluid seal between a tool and a tool holder, the tool having an outer surface and an inner chamber for receiving fluid, the tool holder having a collapsible collet for engaging the outer surface of the tool, the collet having an inner chamber in fluid communication with the outer surface of the tool and having a plurality of slots between the inner chamber and an outer portion of the collet, and a collet nut compressing the inner chamber of the collet against the outer surface of the tool, the apparatus comprising:

an O-ring positioned around the tool between the tool tip and the first end of the collet, the first end of the collet being remote from the tool tip; and a rigid seal positioned about the tool and the O-ring, and positioned between the first end of the collet and the collet nut such that fluid flowing within the slots of the collet is prevented from flowing past the fluid seal.

4. The apparatus of claim 3 wherein the rigid seal further comprises:

a first portion having an inner diameter approximately equal to an outer diameter of the tool and having an outer diameter larger than an outer diameter of the O-ring;

a second portion connected to the first portion, the second portion encompassing the O-ring and having an inner diameter approximately equal to the outer diameter of the O-ring; and a third portion connected to the second portion at an angle of between 0 degrees and 90 degrees from the second portion, the third portion positioned between the first end of the collet and the collet nut.

5. A tool assembly device comprising:

a tool having an outer surface and an inner chamber for receiving fluid, the inner chamber having an entrance opening and an exit opening;

a collapsible collet for engaging the outer surface of the tool, the collet having an inner chamber in fluid communication with the outer surface of the tool and having a plurality of slots between the inner chamber and an outer portion of the collet;

a collet nut for compressing the inner chamber of the collet against the outer surface of the tool;

a tool holder for holding the tool, the collet, and the collet nut in position;

a pressurized fluid system connected to the tool holder for providing a pressurized fluid through the entrance opening, the inner chamber, and the exit opening of the tool;

an O-ring positioned around the tool between a tool tip and a first end of the collet, the first end of the collet being remote from the tool tip; and a rigid seal positioned about the tool and the O-ring, and positioned between the first end of the collet and the collet nut such that fluid flowing within the slots of the collet is prevented from flowing past the fluid seal.

6. The tool bit assembly of claim 5 wherein the rigid seal further comprises:

a first portion having an inner diameter approximately equal to an outer diameter of the tool and having an outer diameter larger than an outer diameter of the O-ring;

a second portion connected to the first portion, the second portion encompassing the O-ring and having an inner diameter approximately equal to the outer diameter of the O-ring; and a third portion connected to the second portion at an angle of between 0 degrees and 90 degrees from the second portion, the third portion positioned between the first end of the collet and the collet nut.

\* \* \* \* \*